May 12, 1970 F. T. MAY ET AL 3,512,138

COMPUTER SYSTEM WITH PRINTER POSITION RECOGNITION AND CONTROL

Filed July 17, 1967 3 Sheets-Sheet 1

MODIFY HORIZONTAL POSITION BYTE (HPB)

INVENTORS
FREDERICK T. MAY
THOMAS H. WILLIAMS

BY D. Kendall Cooper
ATTORNEY

May 12, 1970 F. T. MAY ET AL 3,512,138

COMPUTER SYSTEM WITH PRINTER POSITION RECOGNITION AND CONTROL

Filed July 17, 1967 3 Sheets-Sheet 2

United States Patent Office 3,512,138

Patented May 12, 1970

3,512,138

COMPUTER SYSTEM WITH PRINTER POSITION RECOGNITION AND CONTROL

Frederick T. May and Thomas H. Williams, Lexington, Ky., assignors to International Business Machines Corporation, Armonk, N.Y., a corporation of New York

Filed July 17, 1967, Ser. No. 653,781

Int. Cl. G06c *29/00*

U.S. Cl. 340—172.5 9 Claims

ABSTRACT OF THE DISCLOSURE

The invention concerns a computer system with memory facilities, memory addressing circuits, arithmetic circuits, an input/output printer having the usual printing and functional capabilities and operable to print, space, tab, backspace, etc. from a left-hand margin for the preparation of accounting documents, and essentially electronic logic for keeping track of the horizontal position of the printer in relation to the document by a numerical count stored in memory, with appropriate updating as printing and spacing occurs. Provision is made for entering predefined printer tab locations into memory, for comparing the actual location of the printer in relation to the stored tab locations and for revising the printer position count in memory under various circumstances, such as tabulation in the forward or reverse direction. Additional means is provided for testing the printer location in relation to the document as the computer program proceeds and for continuing the program or initiating subroutines, depending upon the results of the test.

CROSS REFERENCES TO RELATED PATENTS AND APPLICATIONS

The following patents are of interest:

U.S. Pat. 2,919,002, L. E. Palmer, inventor; entitled "Selection Mechanism for a Single Printing Element Typewriter."

U.S. Pat. 3,082,854, F. E. Becker et al., inventors; entitled "Typewriter Input Checking Mechanism."

U.S. Pat. 3,297,992, W. L. McDonald et al., inventors, entitled "Data Processing and Accounting System."

U.S. application Ser. No. 609,670, filed Jan. 16, 1967; D. E. Sims, P. J. De George and R. F. Ross, as inventors.

U.S. application Ser. No. 594,542 and U.S. Pat. 3,417,-378, filed Nov. 15, 1966; R. C. Heard and L. M. Hornung, as inventors.

OTHER REFERENCES

The following additional references are of interest:

IBM Customer Engineering Instruction Manual for the "Selectric"[1] Printer, Form No. 241-5032-2, dated January 1966.

IBM Customer Engineering Manual of Instruction for "Selectric" Input/Output Keyboard Printer, Form No. 241-5159-2, dated 1965.

IBM Customer Engineering Universal Reference Manual for "Selectric" Input/Output Keyboard Printer, Form No. 241-5182-0 dated June 30, 1963.

BRIEF BACKGROUND OF INVENTION

Field

In computer systems, particularly those that include an input/output printer for entry of data and preparation of accounting documents, there is an ever present need for determining, recognizing, and controlling the location of the printing means in relation to the document. A typical small accounting system of this nature is described in the McDonald et al., Pat. 3,297,992 referred to in the Cross Reference section. The McDonald et al., system incorporates an input/output printer with a single element print head movable from a left hand margin, more particularly described in the Palmer and Becker et al., patents and in the various Customer Engineering Manuals noted above. The McDonald system maintains both a vertical and horizontal control of a document, such as an invoice, by means of vertical and horizontal tapes and associated driving and sensing mechanisms. Means is provided for testing the location of the printer in relation to the document, and particularly a coordinate location as determined by the combined indications of the horizontal and vertical tape units. The McDonald et al., system further has core memory facilities, arithmetic facilities, a magnetic ledger card processing unit, and various clocking, memory accessing and logical circuits required for the execution of accounting programs. The system does not utilize a stored program in the conventional sense, but can be readily adapted for such capability.

[1] Trademark.

Description of the prior art

The field of the present invention and the prior art both exemplified by the McDonald et al., patent, just referred to. As indicated, the McDonald system derives printer position information from horizontal and vertical tape units that are mechanically coordinated with the printing mechanism to supply indications as printing of documents proceeds. The individual tape units may utilize a thermoplastic tape having perforations in a plurality of channels and incorporating a star-wheel sensing means for sensing the perforations.

In other prior art, counting means has been provided for keeping track of the printing position of a system of this nature. However, such apparatus has usually incorporated additional mechanisms of complex nature associated with the printer that provide indications of the actual physical location of the printing means in relation to the document. Other apparatus in the prior art has incorporated counting means for maintaining a record of the movement of a printer carriage, and having tabulation facilities movable in either direction.

In general, the prior art devices are characterized by additional hardware, and/or extensive modifications of the printer apparatus in order to operate for the purpose proposed.

SUMMARY

According to the present inventive arrangements, a computer system having an input/output printer recognizes, maintains, and controls the position of the printer in relation to a document with essentially all-electronic facilities. That is, the system incorporates a more or less standard input/output printer with little or no modification and performs the position recognition and the control functions by appropriate use of facilities normally already in the system, including a memory, such as a core memory, memory addressing circuits, arithmetic circuits, and associated logical control circuits. The memory has locations that are preassigned for holding a Horizontal Position byte (HPB) representative of the physical location of the printer in relation to a document. Tabulation bytes contained in a Tabulation word for entry of desired tab locations on the document, and, when desired, Back-tab bytes, contained in a Back-tab word into which tab locations accessed in a reverse direction, may be entered. Additional facilities are provided for testing the Horizontal Position byte in relation to the Tab or Back-tab indications for determining the subsequent course of the program in the system, and contemplating subroutines, as appropriate.

Ordinarily, as printing on a document proceeds in the forward direction, each character printed, adds "1" to the Horizontal Position byte, each space adds "1" to the Horizontal Position byte, and each backspace deducts "1" from the Horizontal Position byte. The left margin established by the operator or programmer determines a zero reference point from which the count proceeds. Updating of the Horizontal Position byte upon occurrence of a tabulation in the forward direction or a Back-tabulation occurs in a unique fashion and without the necessity for extensive additional hardware in association with the printing means. As an example, whenever a tab in the forward direction occurs, the tab locations previously entered in the Tab word in memory are accessed in sequence and compared with the Horizontal Position Byte in order to update the latter. As soon as a Tab byte that is greater than the Horizontal position byte is encountered, it is entered in the Horizontal Position byte location and replaces the previous count therein, thereby updating the Horizontal Position byte concurrently with the actual mechanical tabulating operation. A reverse sequencing and replacement of the Horizontal Position byte occurs during Back-tab operations. During the course of the accounting program, tests are arranged at convenient intervals for testing the status of the Horizontal Position byte in order to determine the actual physical location of the printer in relation to the document. In a typical case, the Test instruction includes an operation code that indicates that it is a Test instruction, a Test byte, and a Branch address. If the Horizontal Position byte compares favorably with the Test byte, a branch may then be initiated to the address specified in the instruction. Other programming routines in the system may contemplate the testing and modification of the Horizontal Position byte whenever deemed necessary during the program.

OBJECTS

Accordingly, an object of the present invention is to provide a computer system with printer position recognition and control that is essentially and primarily electronic, with attendant simplification of the routines involved in the system.

Another object of the invention is to provide a printer location determination and control arrangement in a computer system that makes use of hardware already available in the system with minimum modifications.

Also, an object of the invention is to provide a computer system format arrangement that is based on the programming criteria of the system, thereby insuring compatability with the system and simplifying the maintenance of format indications and the implementation of testing and program routines.

A further object of the invention is to provide a format and printer control arrangement for a computer system, the recognition and updating functions of which are performed at least as rapidly as the other computer operations.

Still another object of the present invention is to provide a printer position capability for a computing system that supplies every basic requirement of the system in keeping track of printing, spacing, and back-spacing operations, as well as tabulation operations in both forward and reverse directions.

The foregoing and other objects, features, and advantages of the invention will be apparent from the following more particular description of the preferred embodiment of the invention as illustrated in the accompanying drawings.

The following abbreviations and symbols are used in the present case:

| Abbreviation | Definition | Comment |
|---|---|---|
| A Reg | A Register | Stores HPB byte operand; also used in basic arithmetic operations. |
| An | Binary 1-2-4-8 outputs of A Register. | |
| C/B | Carry/Borrow | One of accumulator inputs or outputs. |
| Clear HPB | | Reset HPB to zero. |
| CR | Carrier Return | Return of print head to selected margin. |
| HPB | Horizontal Position Byte. | Location in memory stores location of print head in relation to document. |
| MAR | Memory Address Register. | Stores address of next word to be accessed in core memory. |
| OR | | Logical Or circuit. |
| S>A | S Register contents are greater than A Register contents. | Useful during comparison of HPB (A register) with Tab byte (S register). |
| $\overline{S>A}$ | S Register contents are not greater than A Register contents. | Same comment as for S>A |
| S Reg | S Register | Stores Tab byte operand; also used in normal arithmetic operations. |
| Sn | Binary 1-2-4-8 outputs of S Register. | |
| Special Address Control. | | Logic for addressing special words in memory. |
| T1, T2, T3 | Time 1, Time 2, Time 3. | Pulse Times in TR and TW cycles. |
| Tab | Tabulate | Tab operation of Printer; Tab byte in memory. |
| Test Byte | | Compare with HPB to determine if branch is necessary. |
| TR1 | Read 1 Time | Read Horizontal Position Byte from memory. |
| TR2 | Read 2 Time | Read Tab Byte from memory. |
| TW1 | Write 1 Time | Restore Tab Byte to memory. |
| TW2 | Write 2 Time | Restore Horizontal Position Byte to memory. |
| & | And | Logical And circuit. |

DETAILED DESCRIPTION

Introduction to system

Figure 5:
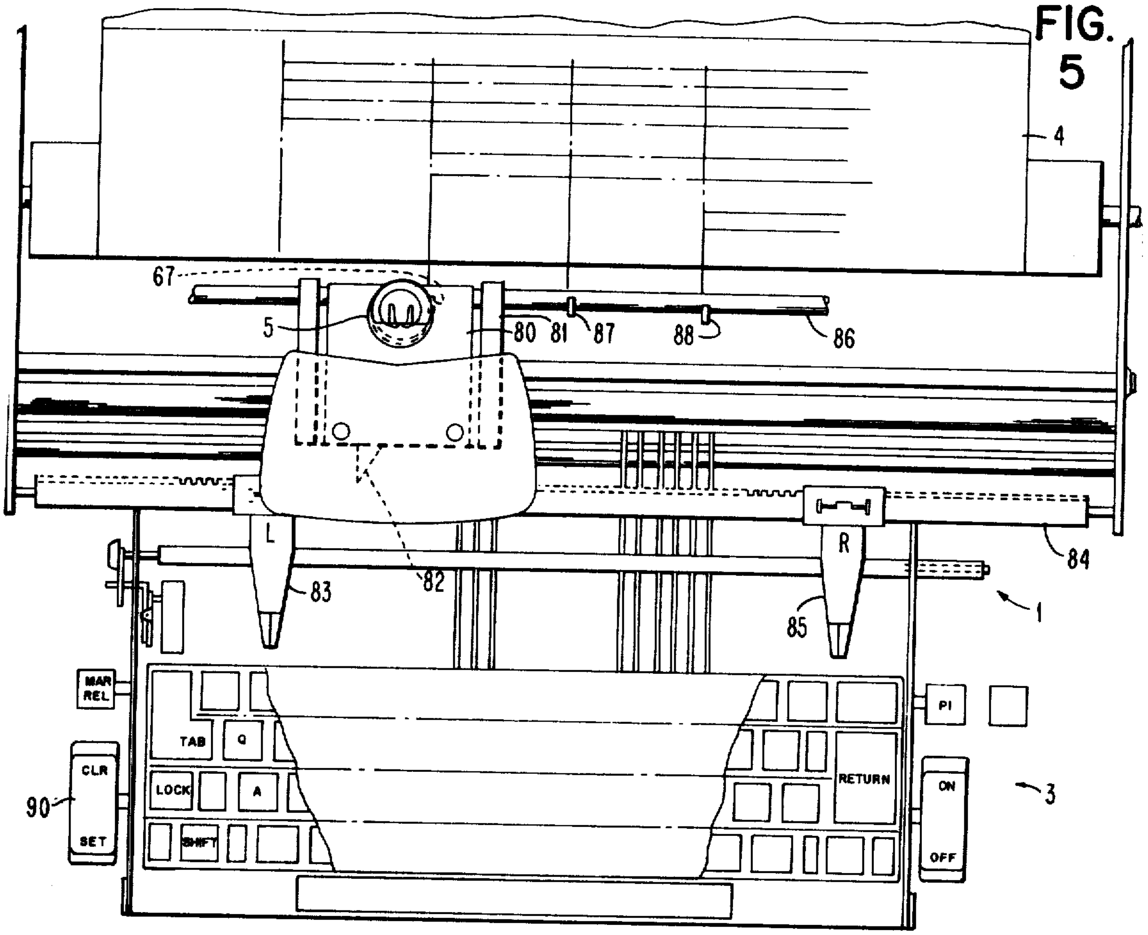
FIG. 5 is a top elevation of an input/output printer that is suitable for use in the present system.
Figure 6:
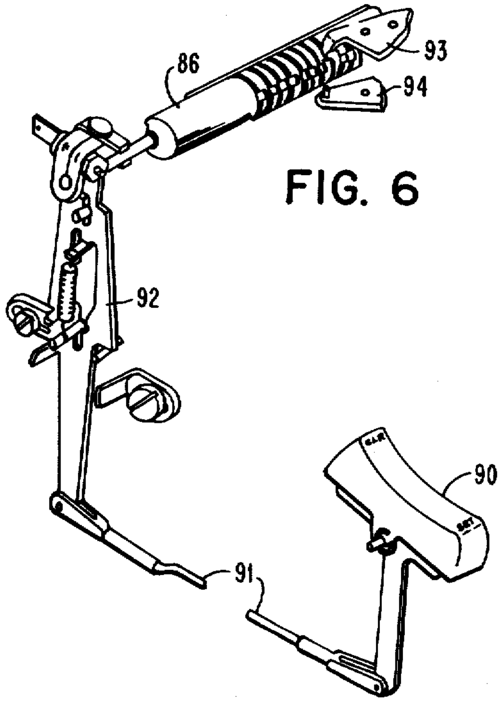
FIG. 6 is a tabulating mechanism for setting and clearing tab stops in the printer of FIG. 5.

The system environment for the present invention comprises a computer accounting apparatus having the usual memory facilities, memory accessing circuits, arithmetic circuits, and input/output printer and at least an additional entry device for entering program instruction into memory to control subsequent operations of the system. Reference is made to the McDonald et al., patent for an accounting system of this general nature. The McDonald system does not contemplate the entry of a stored program and uses a prewired control panel in conjunction with program searching and stepping matrices, instead. However, any well known programming technique may be used in the system. The various storage, logic, and electronic control facilities are particularly shown in FIGS. 1, 3, and 7, in the present case. A suitable printer configuration is shown in FIGS. 5 and 6.

A system of the type described is generally provided for the preparation of various kinds of accounting documents, such as invoices, payrolls, and the like. The system derives data from various sources, makes computations with arithmetic factors and supplies numeric and alphanumeric information to a printer or other output device in order to prepare the documents ultimately required from the system. Provision is usually made for automatic entry and output as well as manual entry and manual control of the system by an operator.

As set forth in the McDonald et al., patent, in a typical accounting application involving an invoice, for example, it is desirable to effect a wide range of programming control functions in connection with particular locations on the form under preparation. An invoice may have various line amounts printed thereon. Also, most invoice forms have a place for a sub total representing the addition of all of the item totals on the invoice. The accounting procedure may involve the computation and printing of a discount amount, a tax amount, an invoice total amount, and similar items. Since the invoice forms, or other forms are usually preprinted with the company's name and address and with the particular arrangement of items desired by the company, it is necessary to correlate the printing of the information in exact conformity with the layout of the form. For this reason, in a system of this nature, it is essential that the location of the printing means in relation to the form be maintained accurately at all times and that it be updated, or cleared, as appropriate during the printing procedures.

PRINTER

Figure 1:
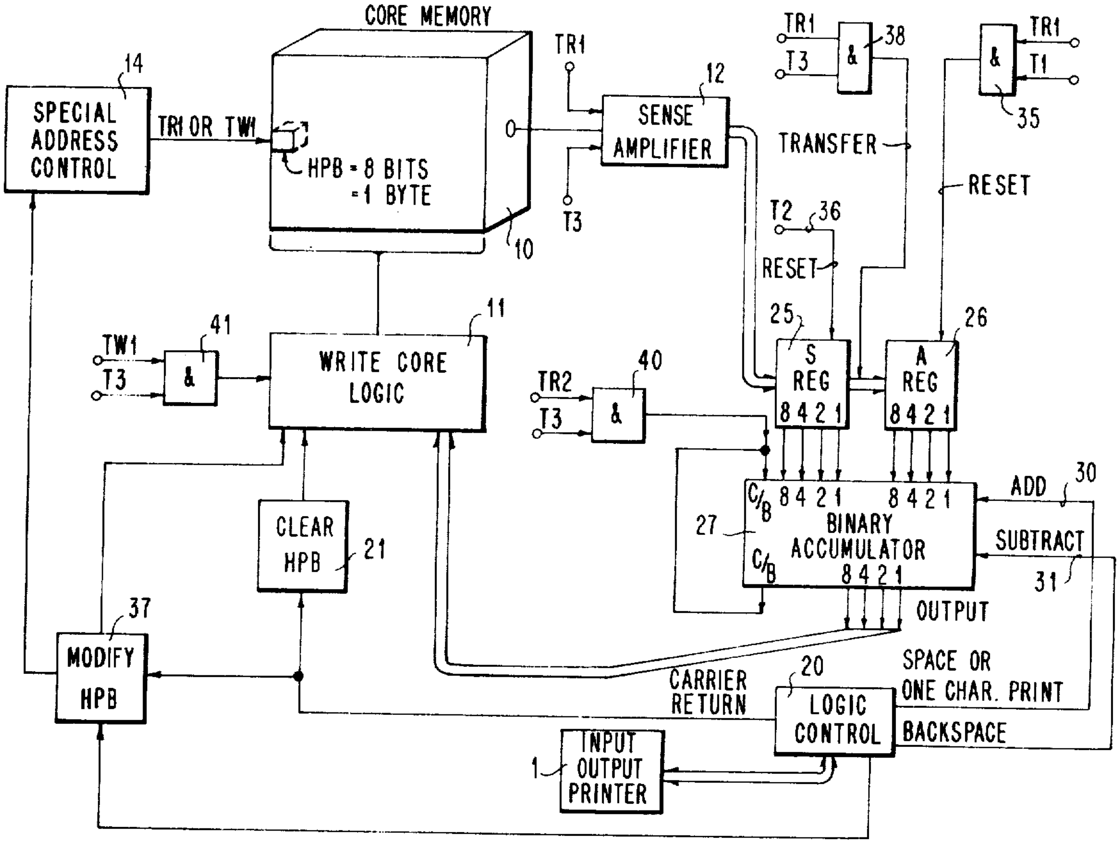
FIG. 1 is a diagram of a computer system including a core memory, memory accessing facilities, arithmetic facilities, an input/output printer, and various logic involved in keeping track of the relative location of the printing means in the printer with respect to a document by means of a counting byte stored in the memory.
Figure 3:
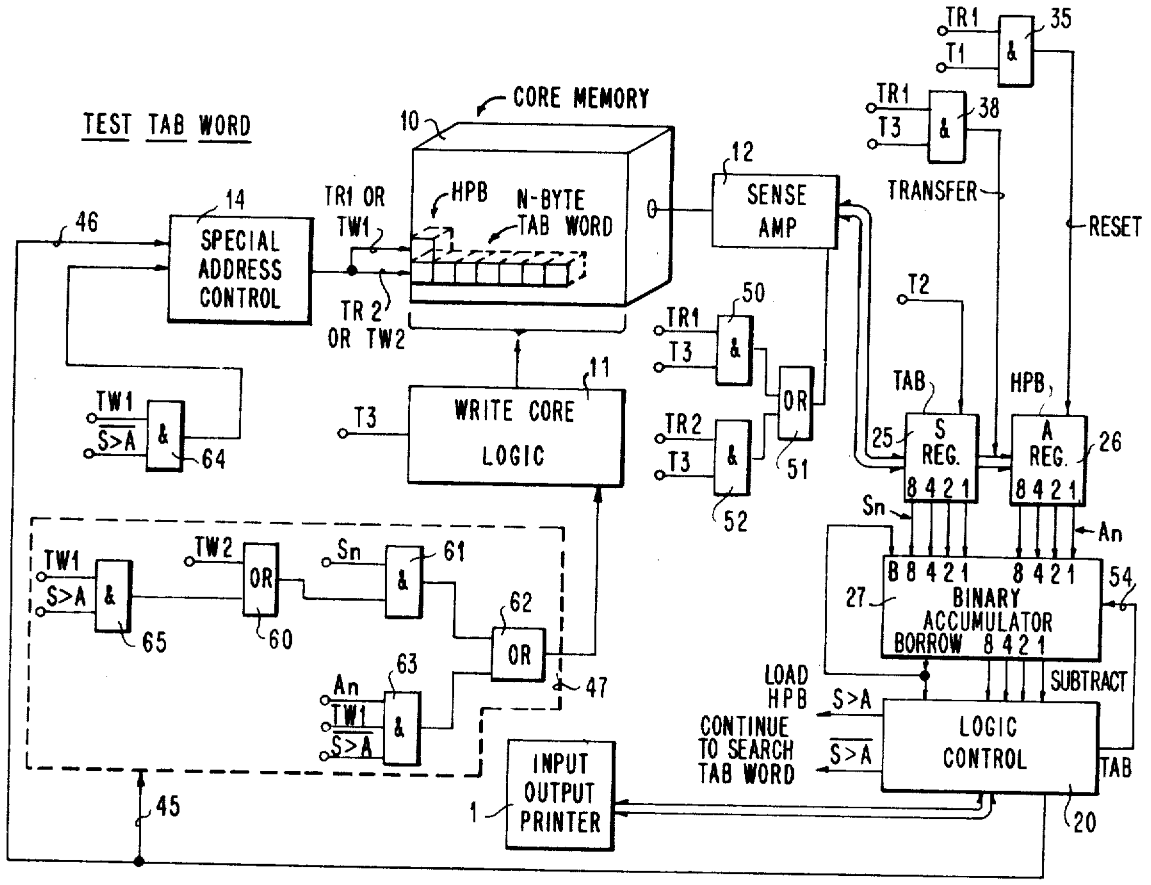
FIG. 3 is similar to FIG. 1 and incorporates additional circuits for testing the Horizontal Position byte in relation to predetermined tab locations stored in the memory.
Figure 7:
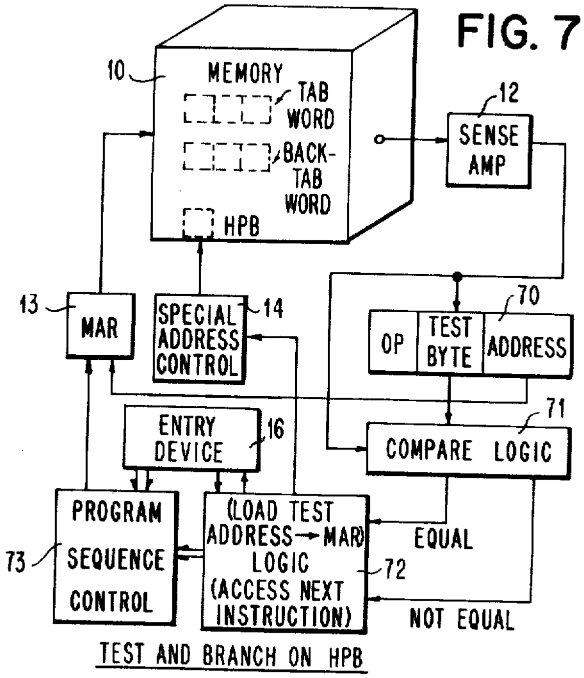
FIG. 7 is a system diagram that illustrates a Test and Branch capability for the computer system set forth herein.

The system of FIGS. 1, 3, and 7 includes a printer 1 with the keyboard 3 having data keys for effecting printing of characters on a document 4 by operation of a single element print head 5 and functional keys for selecting functional operations, such as space, backspace, carrier return, and tab. When a "Selectric" type printer is used for entry of data into the system, various printer transmit contacts are operated as set forth in the "Selectric" manuals to establish a coded configuration representative of the printer character or function involved. Also, various printer feedback contacts are operated to transmit signals for control purposes. In the "Selectric" printer, the contacts are designated C1, C2 Print Feedback contacts, C3 Upper Case contacts, C4 Lower Case contacts, C5 Tab, Space, and Backspace contacts, and C6 Carrier Return contacts. The printer also has Carrier Return interlock contacts and Tab interlock contacts.

Document 4 has a random variety of indented paragraphs as shown. Print head 5, FIG. 5, is mounted on a rocker 80 that is supported in a carrier 81 for movement left to right adjacent the document 4. A margin stop latch 82 is arranged to contact a left margin limit 83. A right margin limit 85 determines the right-hand typing limit for document 4. Printer 1 also has a tab rack 86 with representative tab stops 67, 87, and 88. Tab stop 87 is shown in a reset condition and tab stops 67 and 88 in a set condition.

Keyboard 3 has a Set-Clear keybutton 90 arranged to set and clear stops in the rack 86 as shown in FIG. 6. An individual tab stop is set by moving print head 5 to the desired tab location and depressing keybutton 90 at the Set end. This operates a link 91 and a Set and Clear arm 92 and rotates rack 86 in a counterclockwise direction. As rack 86 rotates, the tab stop corresponding to the desired location strikes the escapement bracket projection 93 which rotates the stop in a clockwise direction in relation to the other tab stops on rack 86. Thereafter, the set stop is effective to encounter a finger on carrier 81 as print head 5 moves to the right in FIG. 5 and thereby stop print head 5 in the desired location so long as the tab stop remains set.

To clear a previously set stop, print head 5 is again moved to the tab location to be cleared and the Clear portion of keybutton 90 is depressed. This operates the Set and Clear arm 92 to rotate rack 86 clockwise. A tab stop that has been set encounters the escapement bracket projection 94, and is effectively moved counterclockwise to its normal home position, which it assumes when keybutton 90 is released. Thereafter, the stop is out of the way of the pin on Carrier 81 and is ineffective.

The typist sets the left margin stop 83, FIG. 5, to the desired left margin location and thereafter sets the tab stops shown to control paragraph indentation.

The lines on document 4 represent printed lines of information. Each line usually ends with a single Carrier Return code with the exception of the last line of each paragraph which is normally ended with two Carrier Return codes in sequence.

As described in the various "Selectric" manuals and the patents previously noted, a single Carrier Return code effects a return of the print head 5 to the left margin and concurrently operates indexing mechanism, not shown herein, to space the printer one line space. Two Carrier Return codes in sequence are effective to return print head 5 to the left margin and establish an extra line space, that is, a total of two line spaces between paragraphs.

MEMORY

Memory 10 may be a core memory with sufficient capacity for storing the program of the system and the data involved in arithmetic operations as well an entry and output operations. The memory is organized on a word basis, with each word having a number of bytes, and each byte comprising a number of bits, such as four or eight. As an example, individual four-bit bytes may contain bits designated 8–4–2–1 representative in a well known manner of a binary numeric value. Information is ordinarily written into memory 10 under control of Write Core Logic 11 and data is extracted from memory through the sense amplifier circuits 12. As indicated in FIG. 7, the Write Core Logic may include a Memory Address Register (MAR) 13 for normal accessing of data from memory.

According to the present invention, memory 10 includes a number of special word locations that are accessed under control of the Special Address Control 14. In the Abbreviations listing previously given, these include the Horizontal Position Byte, the Tab word having a number of individual Tab bytes and the Back-tab word having individual Back-tab bytes. The various special words are accessed under special conditions to be described in greater detail and, in conjunction with the arithmetic circuitry shown particularly in FIGS. 1 and 3, provide a unique way of keeping track of the printer position during operation of the system, and for making various decisions required, and effecting control of the system.

The Horizontal Position byte stores a binary count that is representative of the horizontal location of print head 5 from the left margin determined by the setting of left margin stop 83 and is kept updated as printing and spacing of print head 5 proceeds or when tab operations occur.

The Tab word and Back-tab word locations in memory 10, each comprise a plurality of bytes. In a typical case, each byte might comprise eight bits. Using the binary numbering system, this gives each byte a capacity for storing a count of 1 to 256 and of course the reset, or "0" condition. In connection with this, the circuitry of FIGS. 1 and 3 show only 4 bit positions, designated 8–4–2–1, to simplify the diagrams.

Prior to the initiation of an accounting program, the instructions required are entered into memory 10 as by means of an entry device 16, which may be a card reader or similar device, FIG. 7. Concurrently, with this operation, the binary values of desired tab locations on printer 1 are also entered in the special words for this purpose, that is the Tab Word and the Back-tab Word. These words may be of any desired length to accommodate the normally encountered number of tab locations in the system. The tab stops on printer 1, such as tab stops 67, 87, and 88 are set or cleared, as the case may be, to correspond with the tab locations stored in the Tab word and Back-tab word areas of memory 10. Accordingly, the normally provided tab stops in printer 1 serve adequately for the forward tabbing operation. If a Back-tabbing operation is desired, it may be desirable to incorporate additional mechanisms of the nature set forth in the De George et al., application for controlling movement of print head 5 from right to left, that is in the Back-tabbing direction. The De George et al., mechanisms generally comprise means for establishing a variable left margin and are readily adaptable for the Back-tabbing operation of the present apparatus. Also, carrier 81 may be supplied with additional fingers like those set forth in the various "Selectric" manuals that cooperate in a reverse direction with any tab stop that has been set.

To illustrate the operation of the present inventive arrangements, it may be assumed that the Tab word has individual bytes storing tab locations as follows:

12–29–43–57

In addition, it is assumed that the Back-tab word stores the same tab locations, only in a reverse order, that is, as follows:

57–43–29–12

LOGIC RULES

The logic is organized as follows:

(1) Clear Horizontal Position byte with a carrier return.

(2) Add 1 to Horizontal Position byte for every print or space cycle. (Implemented with the accumulator. Allows for subtract if backspace is available. Occurs for manual or computer operations.)

(3) Update Horizontal Position byte when tab occurs. (Compare Horizontal Position byte to the tab values stored in Tab word until one is greater than Horizontal Position byte. This occurs as the mechanical motion is actuated. Occurs for manual or computer operations.)

(4) Update Horizontal Position byte when "Back-tab" occurs. (Compare Horizontal Position byte to the Back-tab values stored in Back-tab word until one is less than Horizontal Position byte. Load this byte into Horizontal Position byte. This occurs as the mechanical motion is actuated. Occurs for manual or computer operations.)

(5) A Test I/O and Branch Instruction is used to sample the state of Horizontal Position byte.

| Op Code | | Test Byte | Branch Address | |
|---|---|---|---|---|
| 8 | 7 | | B1 | D1 |

If the test byte is equal to the Horizontal Position byte, then the branch is taken to the address specified by B1–D1. Otherwise, the next sequential instruction is accessed.

HORIZONTAL POSITION BYTE AND ITS MODIFICATION

Figure 2:
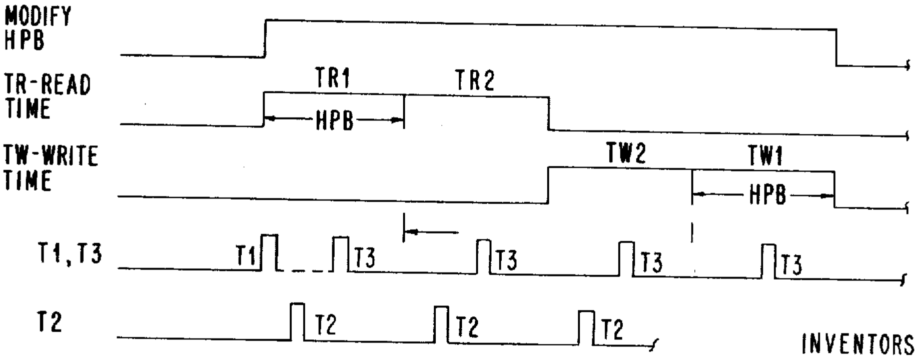
FIG. 2 is a timing diagram for use in conjunction with the apparatus shown in FIG. 1.

Reference is made to FIGS. 1 and 2 for a more detailed consideration of the Horizontal Position byte and its modification. Initially, it is assumed that print head 5 is at the left margin established by left margin stop 83, FIG. 5. Whenever a Carrier Return occurs, as indicated in the Logic Rules just set out, the Horizontal Position byte is cleared under control of the logic control block 20, FIG. 1, and the Clear Horizontal Position byte block 21. Regardless of what position on printer 1 is selected for the left margin, it is arbitarily selected as zero position in so far as the Horizontal Position byte is concerned. Each time print head 5 is actuated against document 4 for printing a character, and each time a space operation occurs, a count of "1" is added to the Horizontal Position byte in memory 10. This is also set forth in the Logic Rules. Also, each time a backspace operation occurs, a count of "1" is subtracted from the Horizontal Position byte. The necessary arithmetics involve S Register 25, A Register 26, and the Binary Accumulator 27. Reference is made to the Heard et al., application for a description of normal arithmetic operations involving an S Register, A Register, and accumulator. The S Register 25 is also used in the Tab Word testing operations to be described in connection with FIG. 3.

Accumulator 27 operates in a conventional manner having inputs for two factors, in this case, supplied by S Register 25 and A Register 26, and providing binary outputs for writing back to memory 10 through logic 11. Accumulator 27 also has Carry/Borrow (C/B) inputs and outputs. During the modification of the Horizontal Position byte, in fact, the Carry input of accumulator 27 is used to force a "1" into the accumulator for the necessary addition of "1" as printing and spacing takes place and the Borrow input is activated to subtract "1," as during a backspace operation.

Logic control 20 provides appropriate add or subtract signals by lines 30 and 31 to cause addition or subtraction of factors by accumulator 27, as required.

The signals on lines 30 and 31 are developed in a conventional fashion from logic control 20 and may occur, as an example, any time the programming logic requires the operation of the input/output printer 1. The signal may also be supplied when printer 1 is operated manually. Ordinarily, if printer has an electrical keyboard, the signals on lines 30 and 31 are also developed electrically as a result of operation of the printer. If printer 1 has a mechanical keyboard, such as that set forth in the various "Selectric" manuals, a signal may be derived from the various circuit breaker contacts C1, C2, etc. previously discussed in the printer selection above.

A description of a typical cycle of operation of printer 1 and modification of the Horizontal Position byte will illustrate the principles involved. The timing chart of FIG. 2 includes agating line designated "Modify HPB" that is raised whenever a change in the Horizontal Position byte is required. The timing sequences involve at least four major cycles designated TR1, TR2, TW2, and TW1. Various pulses termed T1, T2, and T3 are provided for timing control. For convenience, since only one T1 pulse is utilized, the T1 and T3 pulses are combined on the same line in connection with the cycle indications TR1–TW1. As previously shown in the Abbreviations table, the TR intervals represent Read intervals when data is accesed from memory 10 and the TW intervals indicate Write time intervals when data is restored to memory 10.

At TR1–T1 time, A Register 26 is reset by And circuit 35. At T2 time, S Register 25 is reset by line 36. Logic control 20 gates the Modify HPB block 37 which in turn controls the Special Address control 14 for accessing the Horizontal Position byte from memory 10. At TR1–T3 time, Sense Amplifier 12 supplies bit indications representative of the value in Horizontal Position byte to S Register 25. The contents of S Register 25 are immediately gated to A Register 26 by the And circuit 38 also gated by TR1–T3 inputs. At this time, therefore, both S Register 25 and A Register 26 contain the Horizontal Position byte from memory 10. However, at TR2–T2 time, S Register 25 is again reset and cleared. Binary accumulator 27 responds to inputs from S Register 25 and A Register 26 as well as the Carry/Borrow input, but since S Register 25 has been cleared, the net effect is that accumulator 27 considers only the inputs from A Register 26 and the Carry/Borrow input. At TR2–T3 time And circuit 40 gates the Carry/Borrow input and depending upon which of the lines 30 or 31 is conditioned, a "1" is added or subtracted in the Horizontal Position byte. The accumulator 27 outputs are directed through Write Core Logic 11 for return to memory 10 at TW1–T3 time under the control of And circuit 41. As a matter of interest, the TW2 time interval is not made use of in the Modify Horizontal Position byte operation but is used in the Test Tab word operation in FIG. 3.

UPDATING OF HORIZONTAL POSITION BYTE DURING TAB OR BACK-TAB OPERATIONS

Figure 4:
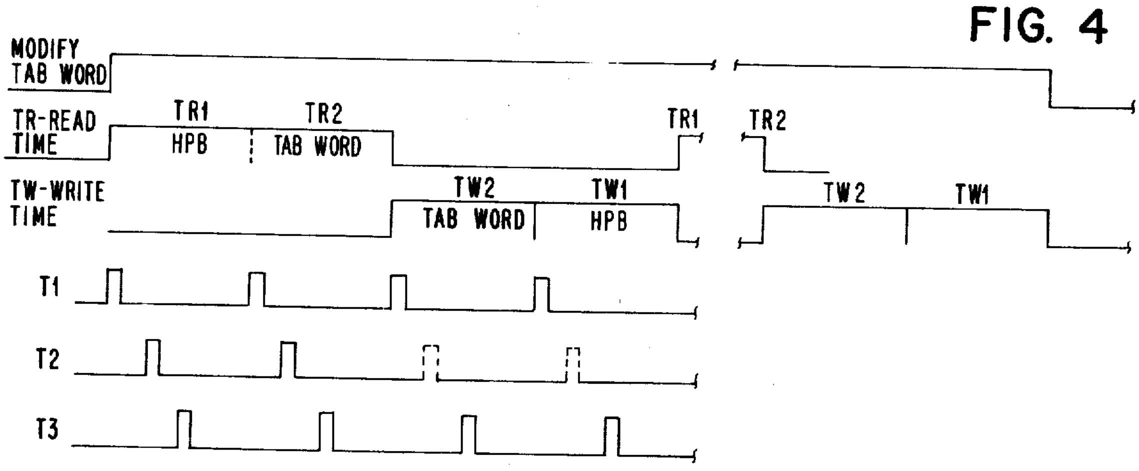
FIG. 4 is a timing diagram for use with the apparatus of FIG. 3.

According to the principles of the present invention, it is not necesary to have complicated mechanisms or apparatus to insure that the Horizontal Position byte accurately reflects the actual location of print head 5 in relation to document 4 at all times, even during Tabbing in the forward direction or Back-tabbing. Reference is made to FIGS. 3 and 4 for a detailed consideration of the updating of the Horizontal Position byte during tab operations.

FORWARD TAB

During forward tabbing, the Horizontal Position byte is compared with the tab location values in the Tab word, previously stored by the programmer in sequence from lowest to highest order until one of the tab location values is greater than the Horizontal Position Byte, at which time it is written into the Horizontal Position byte. During the Modify Horizontal Position byte operation of FIGS. 1 and 2, the Horizontal Position byte is modified in an incremental fashion, that is, a count of "1" is normally added or subtracted to the contents of the Horizontal Position byte. In contrast, the Test Tab word operation in FIGS. 3 and 4 involves a comparison of the Horizontal Position byte with various tab location values and the non-sequential incrementing of the Horizontal Position byte, rather than a "1" by "1" incrementing or decrementing. A Tab operation is initiated by a signal from logic control 20 to input/output printer 1. While the mechanical tabbing action takes place, the electronics in FIG. 3 are operated to update the Horizontal Position byte to the next tabe location that will be encountered by print head 5.

Logic control 20 also provides signals by lines 45 and 46 to gate a control circuit 47 during the writing back of information into memory 10 and to gate special addres control 14. The S Register 25 and A Register 26 are reset at times comparable to thoe described in connection with FIGS. 1 and 2. At TR1–T3 time And circuit 50 through Or circuit 51 gates Sense Amplifier 12 to transfer the Horizontal Position byte from memory 10 into S Register 25 and simultaneously into A Register 26. At TR1–T2 time, S Register 25 is reset. At TR2–T3 time And circuit 52 through Or circuit 51 gates the lowest order Tab value or Tab byte or Tab Word in memory 10 into S Register 25.

Since And circuit 38 is gated only at TR1–T3 time, the S Register 25 contents are not transferred to A Register 26, as before. At this time, therefore, the S Register 25 has the first tab location value and the A Register 26 has the Horizontal Position byte. A "Tab" signal on line 54 activates the subtract input of accumulator 27 to subtract the S Register contents from the A Register contents. The outputs of the accumulator in connection with the Borrow output is used by logic control 20 to provide two indications designated $S>A$ or $\overline{S>A}$ as shown in FIG. 3, the further operation of the system will depend upon which of these indications is developed. An $\overline{S>A}$ indication means that the Tab Word byte is not greater than the Horizontal Position byte. With the Tab word storing 12–29–43–57, this would occur, as an example, upon comparison of the "12" with a Horizontal Position byte "17." Accordingly, the system is operative to continue to search the Tab word for the next Tab byte for comparison with the Horizontal Position byte.

During the TW2 interval, Or circuit 60 with And circuit 61 and Or circuit 62 combine to restore the S Register outputs $Sn$ through Write Core Logic 11 to the same byte location in memory 10 from which it was taken. The TW1 input together with a $\overline{S>A}$ combine through And circuit 63 to return the Horizontal Position byte by the An outputs of A Register 26 to the Horizontal Position byte location in memory 10.

The system is now operative to go through another cycle, incrementing the Tab word byte location in memory 10 and comparing this with the Horizontal Position byte as just described. The TW1 and $\overline{S>A}$ inputs to And circuit 64 step Special Address Control 14 in order to access the next Tab Byte. During this cycle, the Horizontal Position byte is gated to A Register 26 and the selected Tab byte is gated to S Register 25 for comparison purposes. Eventually, as the cycles continue, a point is reached where the $S>A$ output form Logic control 20 exists, rather than the $\overline{S>A}$ output. This occurs, as an example, when the Tab byte "29" is compared with the Horizontal Position byte "17." When this happens, the $S>A$ input during the TW1 interval gates And circuit 65 and through Or circuit 60 and And circuit 61 supplies the S Register outputs $Sn$ to Write Core Logic 11 for writing into the Horizontal Position byte location accessed by Special Address Control 14.

In the event two tab operations are required, an updating of the Horizontal Position byte as just described occurs for each tab operation. This happens because the electronic portion of the system operates at a much higher speed than the mechanical tabbing operation of printer 1, and the updating of the Horizontal Position byte during the first Tab operation takes place before the mechanical phases are completed.

BACK-TABBING

When Back-tabbing operations occur in the system, the logic from Logic Control 20, FIG. 3, is reversed from that just described. As illustrated previously, the Backtab Word may contain the values 57–43–29–12, in that order, in memory 10. Upon initiation of a Back-tab, the "57" is first accessed and compared with the Horizontal Position byte, then the "43," and so on. This arrangement simplifies the comparing networks and operation. In this case, however, the system is looking for an $\overline{S>A}$ condition from Logic Control 20 rather than an $S>A$ condition, as before. When the $\overline{S>A}$ condition occurs, then the tab value stored in S Register 25 is forced into the Horizontal Position byte location in memory 10.

TEST AND BRANCH OPERATION

Frequently, during the course of an accounting program, it is desirable to test the horizontal location of print head 5 in relation to document 4 in order to determine whether a particular sub-routine is to be initiated or other action taken. This is taken care of by the programmer who places Test and Branch Instructions at appropriate locations in the programming sequence. Such a test may occur automatically during the running of a program or it may occur upon the completion of the manual typing by the operator. The Test and Branch Instruction enables the system to check for the exact location of print head 5, to initiate a forward tab or back tab as required or to go into an electronic computing subroutine, as necessary.

As the Logic Rules indicate, such an instruction has its own special format including an Operation code, a Test byte, and a Jump Address. At such a time in the program sequence, the Test instruction is entered into block 70, FIG. 7, and is compared by logic 71 with the contents of the Horizontal Position byte accessed by Sense Amplifier 12.

A "Not equal" comparison may simply initiate the accessing of the next instruction by logic 72 that controls program sequence control block 73. However, equality of the Test byte in the Test and Branch Instruction with the Horizontal Position byte initiates a Load Test Address from the Test instruction in block 70 into the Memory Address Register 13, whereup on the system is operative to access the particular location in memory 10 that is required at this point. This may initiate an entire new sequence of instructions, such as those involved in a subroutine. Provision may be made for testing for equality, less than, or more than.

SUMMARY

From the foregoing description it is evident that the inventive arrangements set forth herein provide considerable flexibility and accuracy in format control of a computer system. The relationship of the printing means and the document is monitored at all times with great speed and minimum modifications to the system hardware. The arrangement provides additional testing and subroutine capabilities in the system.

While the invention has been particularly shown and described with reference to a preferred embodiment, it will be understood by those skilled in the art that various changes in format and detail may be made without departing from the spirit and scope of the invention.

What is claimed is:

1. Format control apparatus, comprising:

a printer, said printer having left margin and right margin controls and a keyboard for entry of data and initiation of printer operations, such as spacing, backspacing, tabulation, and return, and further having printing means operative to print data on a document;

means in said printer for effecting relative movement between said printing means and said document as said printing and functional operations proceed;

a memory facility, said facility having means for storing data in a plurality of locations;

memory accessing means for accessing individual locations to read data or write data in said memory;

arithmetic means activated during operation of said printer to develop a numerical value representative of the location of said printing means in relation to a document;

logic means for controlling said accessing means to maintain said printer location value in said memory, said logic means including means for controlling said accessing means to store tabulation values respectively corresponding to individual physical locations of said printer;

compare means operable upon occurrence of a tabulation operation to compare the printer location value with each of said tabulation values in sequence; and means to update said printer location value by directly substituting the tabulation value coresponding to the next physical tabulation location reached during said tabulation operation.

2. The apparatus of claim 1 wherein:

said movement means includes means to incrementally relatively move said printing means and said document during spacing, backspacing, and printing operations; and wherein said arithmetic means includes means for adding incremental values corresponding to said incremental movement to said printer location value during printing and spacing, and for subtracting such incremental values from said printer location value during backspacing.

3. The apparatus of claim 2 further comprising:

means to return said printing means to a selected margin control; and means activated upon occurrence of a return of said printing means to said selected margin control for resetting said printer location value to zero.

4. The apparatus of claim 2 wherein:

said printer includes means for supplying unique signals respectively indicative of character printing and printer operations, such as spacing and backspacing, to control said arithmetic means to add or subtract, as appropriate.

5. The apparatus of claim 1 wherein:

said accessing means includes means for storing in said memory tabulation values corresponding to tabulation locations in a forward direction of printer movement, and Back-tabulation values corresponding to tabulation locations in a Back-tabulation direction of printer movement; and wherein said arithmetic means includes means to update said printer location value, as appropriate, during occurrence of each tabulation and Back-tabulation operation.

6. The apparatus of claim 1 further comprising:

registers in said arithmetic means designated A and S for respective entry of printer location and tabulation values; and means in said logic means for determining the proper tabulation value to use for updating said printer location value by response to $S>A$ and $\overline{S>A}$ outputs derived from said registers during comparison operations.

7. The apparatus of claim 1 wherein:

said memory facility includes means for storing instructions for controlling operation of said apparatus according to a predetermined program, including Test and Branch instructions accessed at appropriate intervals, each of said Test and Branch instructions comprising at least a Test location value; and wherein said logic means includes means responsive to a Test and Branch instruction for comparing said Test location value and said printer location value for equality or inequality, and further means operative to provide signals to initiate a change in or continuation of said program in dependence upon the results of said comparison.

8. Format control apparatus, comprising:

a printer, said printer having left margin and right margin controls and a keyboard for entry of data and initiation of printer operations, such as spacing, backspacing, tabulation and return, and further having printing means operative to print data on a document;

means in said printer for effecting relative movement between said printing means and said document as said printing and printer operations proceed;

a memory facility, said facility having means for storing data in a plurality of locations;

memory accessing means for accessing individual locations to read data or write data in said memory;

arithmetic means activated during operation of said printer to develop a numerical value representative of the location of said printing means in relation to a document;

logic means for controlling said accessing means to maintain said printer location value in said memory, said logic means including means for controlling said accessing means to store tabulation values respectively corresponding to individual physical tabulation locations of said printer, said tabulation values being arranged in a lower to higher sequence;

compare means operable upon occurrence of a tabulation operation to compare the printer location value with each of said tab values in lower to higher sequence; and means to update said printer location value upon occurrence of a tabulation operation in the forward direction from a selected margin control by directly substituting for said printer location value the next higher tabulation value corresponding to the physical position reached.

9. Format control apparatus, comprising:

a printer, said printer having left margin and right margin controls and a keyboard for entry of data and initiation of printer operations, such as spacing, backspacing, tabulation and return, and further having printing means operative to print data on a document;

means in said printer for effecting relative movement between said printing means and said document as said printing and printer operations proceed;

a memory facility, said facility having means for storing data in a plurality of locations;

memory accessing means for accessing individual locations to read data or write data in said memory;

arithmetic means activated during operation of said printer to develop a numerical value representative of the location of said printing means in relation to a document;

logic means for controlling said accessing means to maintain said printer location value in said memory, said logic means including means for controlling said accessing means to store tabulation values respectively corresponding to individual physical tabulation locations of said printer, said tabulation values being arranged in a higher to lower sequence;

compare means operable upon occurrence of a tabulation operation to compare the printer location value with each of said tab values in higher to lower sequence; and means to update said printer location value when a tabulation operation occurs in the reverse direction from a selected margin control by directly substituting for said printer location value the next lower tabulation value corresponding to the physical position reached during tabulation.

References Cited

UNITED STATES PATENTS

| | | | |
|---|---|---|---|
| 2,831,424 | 4/1958 | Mac Donald | 101—93 |
| 3,236,351 | 2/1966 | Fitch et al. | 197—1 |
| 3,260,340 | 7/1966 | Locklar et al. | 197—19 |
| 3,297,124 | 1/1967 | Sims | 197—19 |
| 3,403,386 | 9/1968 | Perkins et al. | 340—172.5 |

PAUL J. HENON, Primary Examiner

P. R. WOODS, Assistant Examiner